(12) United States Patent  
Ohkubo

(10) Patent No.: US 7,372,479 B2
(45) Date of Patent: May 13, 2008

(54) APPARATUS AND METHOD FOR OPTICAL IMAGE FORMATION CONTROL

(75) Inventor: Hiroki Ohkubo, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 136 days.

(21) Appl. No.: 11/169,671

(22) Filed: Jun. 30, 2005

(65) Prior Publication Data
US 2006/0001735 A1 Jan. 5, 2006

(30) Foreign Application Priority Data
Jun. 30, 2004 (JP) ............... 2004-194313

(51) Int. Cl.
B41J 27/00 (2006.01)
G03G 15/00 (2006.01)
(52) U.S. Cl. .............. 347/261; 347/260; 399/9; 399/37; 399/13
(58) Field of Classification Search ........ 347/260–261; 399/37, 9, 13
See application file for complete search history.

(56) References Cited

U.S. PATENT DOCUMENTS

| 4,613,877 A | * | 9/1986 | Spencer et al. ............. 347/133 |
| 5,740,491 A | * | 4/1998 | Imai ............................ 399/25 |
| 5,754,215 A | * | 5/1998 | Kataoka et al. ............. 347/235 |
| 5,943,087 A | * | 8/1999 | Kataoka et al. ............. 347/250 |
| 6,121,992 A | * | 9/2000 | Girmay ....................... 347/234 |
| 6,137,966 A | * | 10/2000 | Uehara et al. ............... 399/13 |
| 6,378,979 B1 | * | 4/2002 | Anderson .................... 347/19 |
| 6,511,150 B1 | * | 1/2003 | Yoda et al. .................. 347/23 |
| 6,784,911 B2 | * | 8/2004 | Umeki et al. ............... 347/228 |
| 2003/0018933 A1 | * | 1/2003 | Yamamoto ................... 714/47 |

FOREIGN PATENT DOCUMENTS

| JP | 7-294839 | 11/1995 |
| JP | 8-156316 | 6/1996 |
| JP | 2000-3115 | 1/2000 |
| JP | 2002-64927 | 2/2002 |
| JP | 2003-90976 | 3/2003 |
| JP | 2003-259677 | 9/2003 |
| JP | 2004-262234 | 9/2004 |

* cited by examiner

Primary Examiner—Hai Pham
Assistant Examiner—Kainoa Wright
(74) Attorney, Agent, or Firm—Oblon, Spivak, McClelland, Maier & Neustadt, P.C.

(57) ABSTRACT

An image forming apparatus for forming images with an electrophotographic system. The image forming apparatus includes a laser drive unit configured to control a laser light, and an image data transfer control unit configured to control image data from to the laser drive unit. The apparatus also includes a polygon mirror configured to reflect laser light from the electrophotographic system, a polygon mirror drive unit including a motor configured to rotate the polygon mirror, and a power supply level detecting unit configured to detect a voltage level of power supplied to the polygon mirror drive unit by an electric power supply unit. The image data transfer control unit is configured to provide any width and any number of a first pulse signal indicating a state when power supply is cut off to the polygon mirror drive unit.

9 Claims, 12 Drawing Sheets

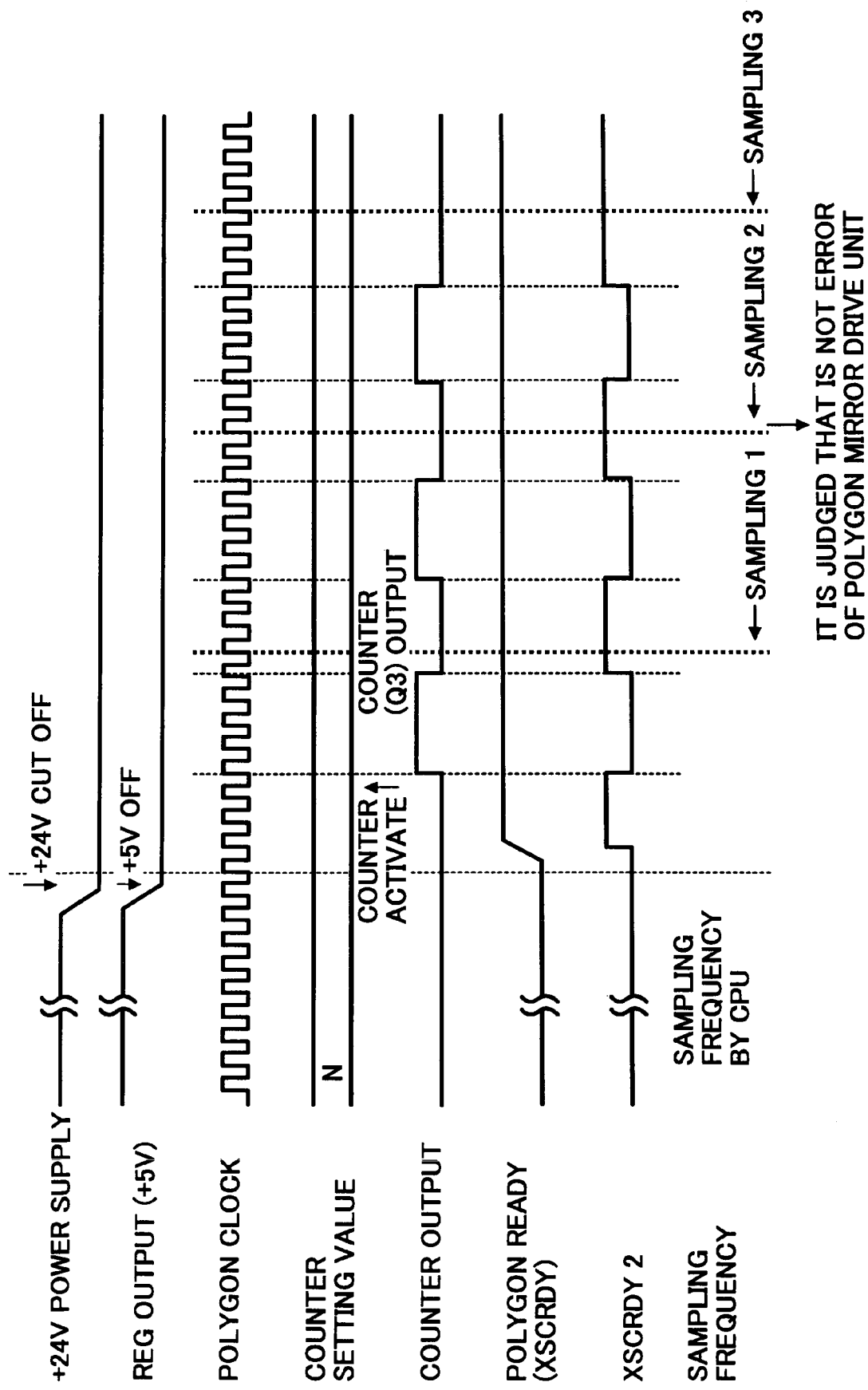

IT IS COMPOSED THAT STOPPER IS REMOVED AND EACH PCU CAN BE PULL.

APPARATUS AND METHOD FOR OPTICAL IMAGE FORMATION CONTROL

CROSS-REFERENCE TO RELATED APPLICATIONS

This patent document is based on and claims priority to Japanese patent application No. 2004-194313 filed on Jun. 30, 2004, the entire contents of which are hereby incorporated herein by reference.

BACKGROUND OF THE INVENTION

1. Field of the Invention

The present invention generally relates to the field of image forming devices such as, for example, copiers and printers. More specifically, the present invention relates to optical control for image formation in image forming devices.

2. Description of the Background Art

In the background art, an image forming apparatus such as a laser printer turns a light on and off according to the image data. The apparatus rotates a polygon mirror by a certain number of rotations according to a resolution (recording density) of the image data. The laser light emitted from a laser diode is scanned with a polarized light by the polygon mirror rotated by a motor, and the apparatus forms images by projecting the laser light on a pre-charged photosensitive drum.

After a predetermined time has passed from when the motor was driven in the image forming apparatus, the number of rotations (RPM: rotations per minute) is checked to determine if an error is present by measuring the current flowing in the motor. And when an error, such as a motor lock, is detected by the current flowing in the motor, an error correction process is executed against the error.

Japanese Laid-Open Patent Publication No. 2003-259677 describes an invention in which an ambient temperature of an exposure unit detected by a temperature sensor is compared with a predetermined temperature. If the ambient temperature is higher than the predetermined temperature, an operation environment of the motor is judged to be better than a predetermined level, and thus the period of time between error judgments (i.e. the judgment permission time) is set to a short value. Further, the apparatus does not make an error judgment until a passing time from the output time of a driving control signal to a motor driving circuit reaches the judgment permission time. The apparatus makes an error judgment based upon the passing time and the ambient temperature.

Japanese Laid-Open Patent Publication No. 2002-64927 describes a system that includes a power supply control unit that controls whether electricity is supplied to an electric component, and an electric component control unit outputs a control signal to the power supply control unit. The system monitors a conduction of a power distribution in the electric component, and the system is reset when the system turns on for a period of time that is longer than a preset time. And the system reset is repeated until the electric component reaches a normal operating condition. If the system does not recover when the reset frequency reaches a preset number, an electric power supply is cut off. The interruption control of the power supply to the system is executed by monitoring of the preset time.

Japanese Laid-Open Patent Publication No. H7-294839 describes a timing changing means that changes the detection timing for checking for an error in a number of rotations of a motor. When the rotation of the motor is signaled to stop, the apparatus decides whether it stops the rotation immediately according to the detected number of rotations or whether it reduces the speed of the rotation and then stops the rotation. In the latter case, the apparatus can also restrict the detection of the error for a certain number of rotations.

Japanese Laid-Open Patent Publication No. H8-156316 describes a control of an applied voltage and plural motors. In a standby mode, an applied voltage is 12V. A driving motor is controlled to a number of N3 rotations. In a copy operation mode, at first the driving motor of the first polygon mirror is applied the standby mode voltage, then the applied voltage is increased to 24V and the number of rotations becomes N5 during the writing operation. When a voltage detection unit detects 18 V, the voltage detection unit outputs a detection signal to the control unit. The control unit outputs a voltage supply signal to the second polygon mirror and activates a second driving motor. In the same way, when the applied voltage of the second driving motor becomes 18 V, then a third driving motor of the third polygon mirror is activated. And when the voltage of the third driving motor becomes 18 V, then a fourth driving motor of the fourth polygon mirror is activated. And a rotation of each polygon mirror is increased sequentially to the number of rotations used in an optical writing. Using this method, it is possible to reduce electric power consumption by providing a time lag for the activation of the driving motors, and an operating time of the first copy is stable using such a control system.

Japanese Laid-Open Patent No. 2003-90976 describes a light polarization unit that drives the rotation of rotating parts with mirrors using a motor. The apparatus includes a temperature sensor for detecting a temperature of the motor, a fan for cooling off the motor, and a fan control unit for controlling the number of rotations of the fan. Using this configuration, it is possible to reduce a rise in temperature and to increase the cooling efficiency of the motor by using an air-cooling system. It is further possible to reduce electricity use using an over-speed rotation of the fan.

Japanese Laid-Open Patent Publication No. 2000-3115 describes a mechanical switch that attaches with an apparatus and is activated by an operating part of a process cartridge. The switch detects the process cartridge. The switch cover is closed only when a process cartridge is detected. The apparatus turns a photosensitive drum with a driving gear of an image support unit. Using this configuration, a connection error of connector between apparatus and a non-volatile memory (NVRAM) is eliminated, and it is possible to detect an error of the NVRAM itself.

However, in the above-mentioned background art, an environmental temperature, a passing time, a number of rotations, a changing state of applied voltage, and an error judgment are determined by monitoring an electric component in a motor control of a polygon mirror. These documents do not describe detecting and monitoring an interception state of a power supply voltage applied to the motor from outside. For example, when a power supply voltage (normally +24V) from a power supply to a motor is cut off by some factor, the motor driving unit cannot operate. As a result, a state signal (e.g., a polygon stack signal) becomes an inactive state, and an error outbreak is notified to the system. Further, since the error state is displayed as the error (polygon motor stack error) from the motor drive means, the error in the power supply is not displayed. Accordingly, it becomes difficult to specify a cause of the error.

Furthermore, in the invention described in JP 2000-3115, a notification means stops the operation of the unit and notifies an operator of this state when a process cartridge is not completely loaded. However, this system allows for the detection of only NVRAM. As a result, a control of the other units when errors occur in those other units is not described in the document.

SUMMARY OF THE INVENTION

The present invention advantageously provides an apparatus for optical writing control, and a method for such control that can easily judge an error state of the apparatus when a power supply to the polygon mirror driving unit is interrupted or lost.

An image forming apparatus is provided that forms an image using an electrophotographic system that includes a laser driving unit controlling a laser light. The apparatus also includes an image data transferring control unit transferring and controlling an image data from upper apparatus to the laser drive unit, a polygon mirror reflecting a laser light from the laser light source, a polygon mirror driving unit driving a motor for rotating the polygon mirror, an electric power supply unit supplying an electric power to the polygon mirror driving unit. The image forming apparatus further includes a power supply level detecting unit that detects a voltage level of the applied power supply to the polygon mirror driving unit from the electric power supply unit. Furthermore, the apparatus is configured to send a pulse signal having any width and any numbers which shows a state when the applied power supply is cut off to the power supply level detecting unit.

According to an alternate embodiment, a method for forming images with an electrophotographic system is disclosed, including the steps of controlling a laser light, controlling to transfer image data from an upper-apparatus to a laser driver unit, and reflecting laser light from laser light source. The method further includes the steps of driving a motor for controlling a rotation of the polygon mirror, supplying an electric power to the motor, and detecting the voltage level of the power supplied to the motor. The method gives any width and any number of pulse signal shown a state when a power supply was cut off to the applied power supply level detecting unit.

BRIEF DESCRIPTION OF THE DRAWINGS

In the following drawings, like references numerals will be used to refer to like elements in the various drawings, in which:

FIG. 6 is a timing chart showing an impressed current of each circuit in an embodiment of the present invention;

DETAILED DESCRIPTION OF THE PREFERRED EMBODIMENTS

Figure 1:
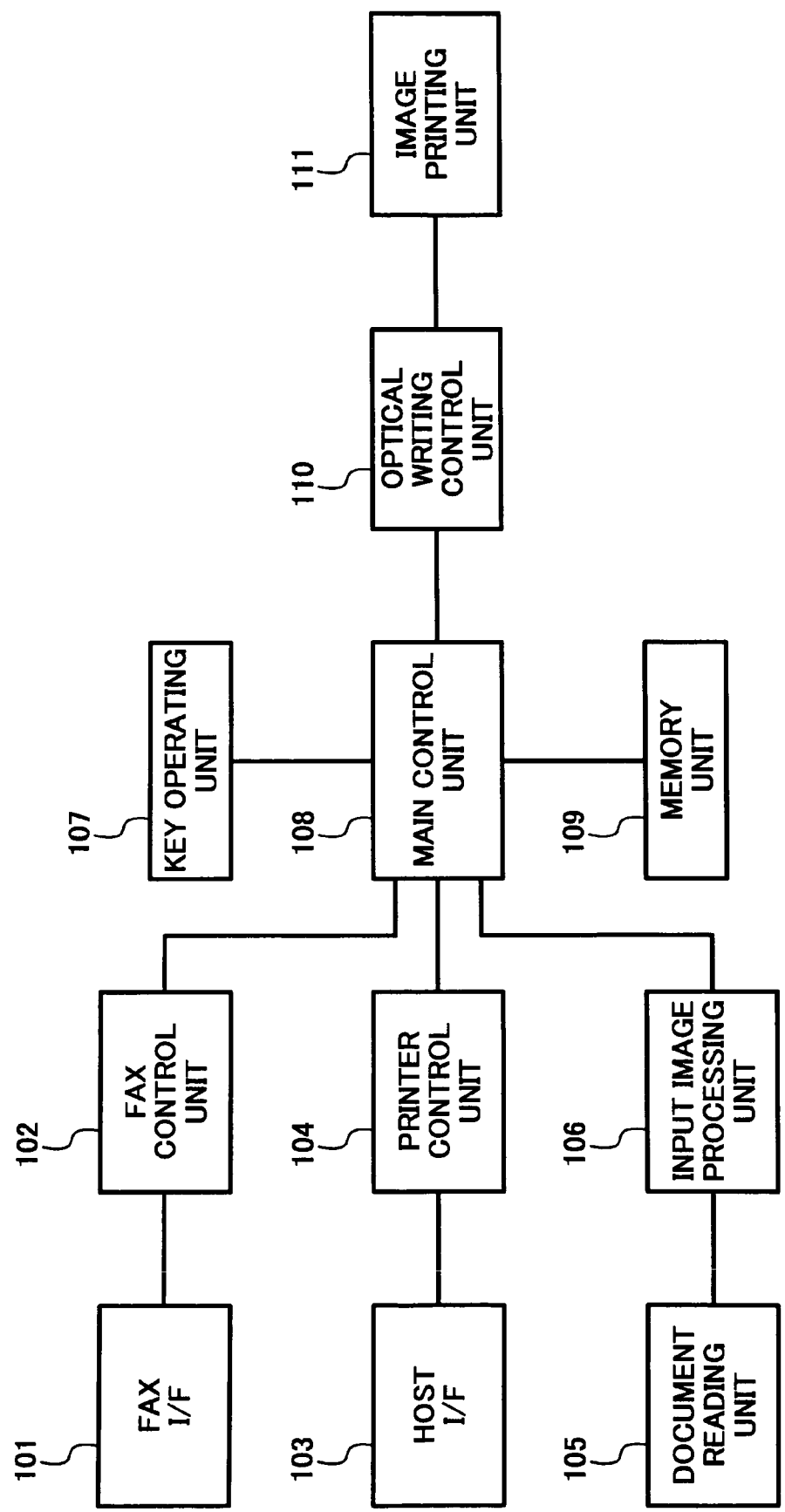
FIG. 1 is a block diagram illustrating an embodiment of a control unit of the image forming apparatus of the present invention.

An embodiment of the present invention is explained referring to the attached drawings. FIG. 1 is a block diagram illustrating a structure of a control unit in a digital color copier. FAX I/F 101 is an interface from a facsimile application, and is an interface for transmission and reception of facsimile data. FAX control unit 102 processes transmission and reception data from FAX I/F 101 according to a communication specification of each facsimile. Host I/F 103 passes image data from a host or network. Printer control unit 104 processes data from Host I/F 103 via a controller. Document reading unit 105 reads a document from a document feeder or ADF (Auto Document Feeder). Input image processing unit 106 executes an input processing of a document read by the document reading unit 105. Key operation unit 107 includes various user interface keys such as a select/setting key, other setting keys, a clear setting mode key, a start/stop keys, an application select key, print number of sheets, sheet size, enlarge/reduce, a user program (UP), a service program (SP), and so on. Main control unit 108 is connected to FAX control unit 102, printer control unit 104, and input image processing unit 106. The main control unit 108 controls data passing from each application of the copier and controls a communication, a timing control, command I/F from the control circuit controlling CPU and each application. Memory unit 109 stores image data from FAX control unit 102, printer control unit 104, and input image processing unit 106. Writing control unit 110 sets an image area according to an image size against the image data from main control unit 108, and executes the laser diode (LD) modulation and sends the results to the engine part of the copier. Image printing unit 111 prints and outputs fixed image to a transfer sheet via a transcription of an optical photoconductor (OPC), and an intermediate transfer belt. The image printing unit 111 also controls each part according to the signal from key control unit 107 and starts printing operation by a command from main control unit 108.

The description below describes the operation of the various components such as FAX control unit 102, printer control unit 104, input image processing unit 106, key operation unit 107, main control unit 108, and writing control unit 110 incorporated into various embodiments. For example, in the case of a copy operation, the main writing control unit 108 transfers image data from input image processing unit 106 to the writing control unit 110. It further continues producing a plurality of prints by repeating data processing in a main scanning direction and a sub-scanning direction using writing control unit 110 (a color writing unit shown in FIG. 2).

Figure 2:
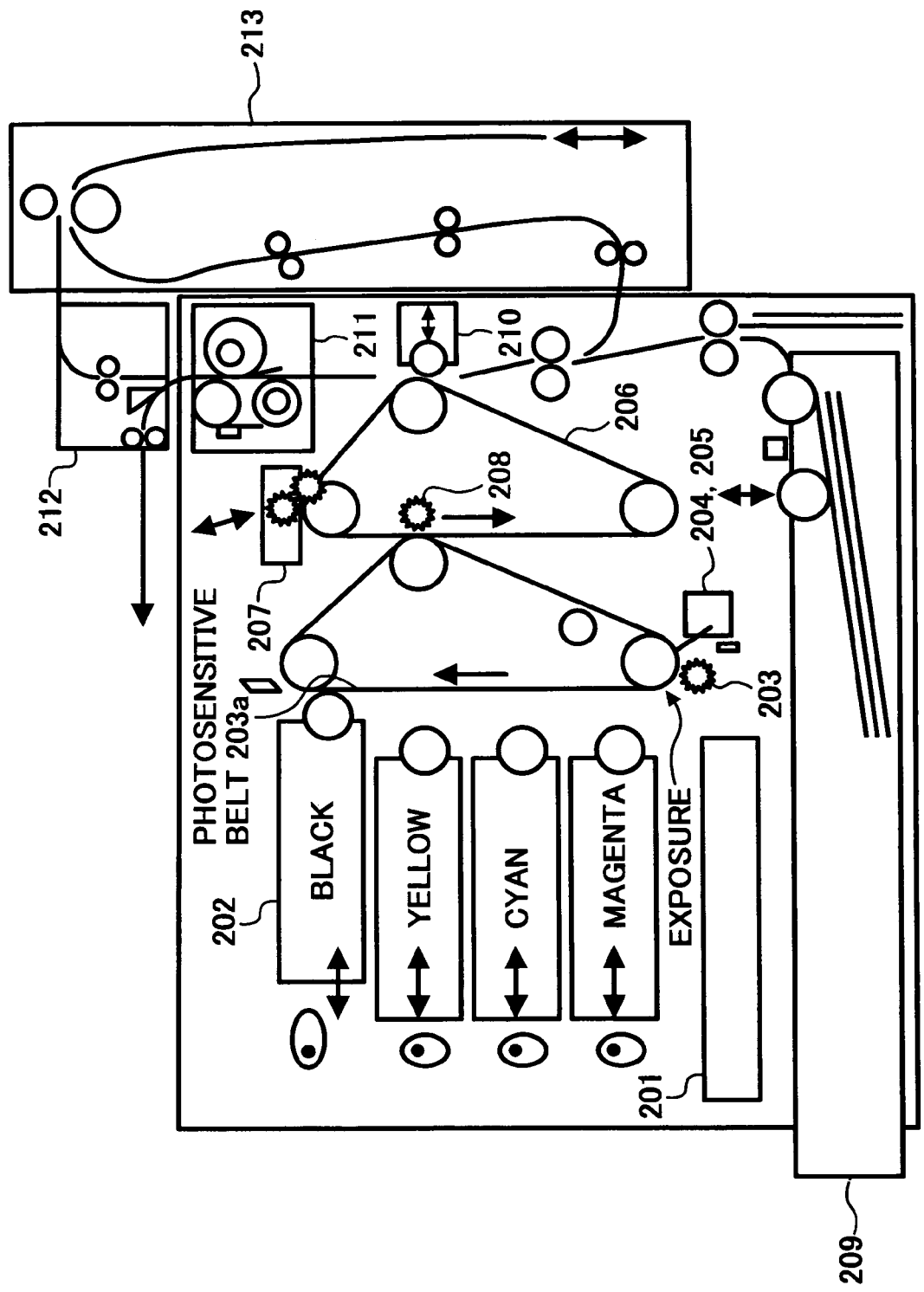
FIG. 2 is a schematic drawing of an embodiment of a digital color printer of the present invention.

FIG. 2 is a schematic diagram illustrating a structure of an engine unit or image printing unit in a digital color printer. The engine unit as shown in FIG. 2 includes a writing control unit 201, a plurality of development units 202, an electrical charging brush 203, a discharge unit 204, a photosensitive drum cleaning unit 205, an intermediate transfer belt 206, a cleaning brush roller 207, a first transfer brush 208, a paper feed tray 209, a second transfer roller 210, an image fixing unit 211, a divergence unit 212, and a duplex printing unit 213.

The engine unit forms a latent image on a photosensitive belt 203a by a laser light exposed from writing unit 201. The belt 203a is charged and discharged using the photosensitive drum cleaning unit 205 and the charging brush 203 with the discharge unit 204.

Once the latent image is formed on the belt 203a it is transferred to an intermediate transfer belt 206, using the first transfer brush 208. A sheet is fed from a paper feed tray 209 to the second transfer roller 210 and the image is transferred from the belt 206 to the sheet. The formed image is thermally fixing on the sheet in fixing unit 211 and goes through divergence unit 212. It further passes by either eject course to the top of the main body or duplex printing unit 213.

By means of the above-mentioned serial movement, a printing is executed on the basis of the printing data which is input over writing control unit 201. In addition, it repeats the serial movement in each color in the case of color printing in two or more colors.

An embodiment of the present invention is explained with reference to FIG. 3. At first an electric power supply unit 301 supplies a power supply of +24V used generally for a polygon mirror drive unit 303 via image transfer control unit 302. A fuse is implemented in the electric power supply unit 301 that functions in error voltage detection of over +24 V. Image data transfer control unit 302 has the same function as the main control unit 108 shown in FIG. 1.

Laser Diode (LD) driving unit 305 includes writing control unit 110 shown in FIG. 1 and outputs a clock signal (PMCLK) for the polygon mirror drive unit, and a polygon mirror driving control signal (PMON). Image data transferred from an upper apparatus (e.g., FAX, printer, copier, scanner, etc.) is processed using a pre-determined process at image processing unit 307 in image data transfer control unit 302 and it is transferred to LD driving unit 305.

The power supply level detection unit 304 has inputs of +24V voltage from power supply unit 301, a polygon mirror state signal from polygon mirror driving unit 303, and a count value from CPU 306.

Figure 4:
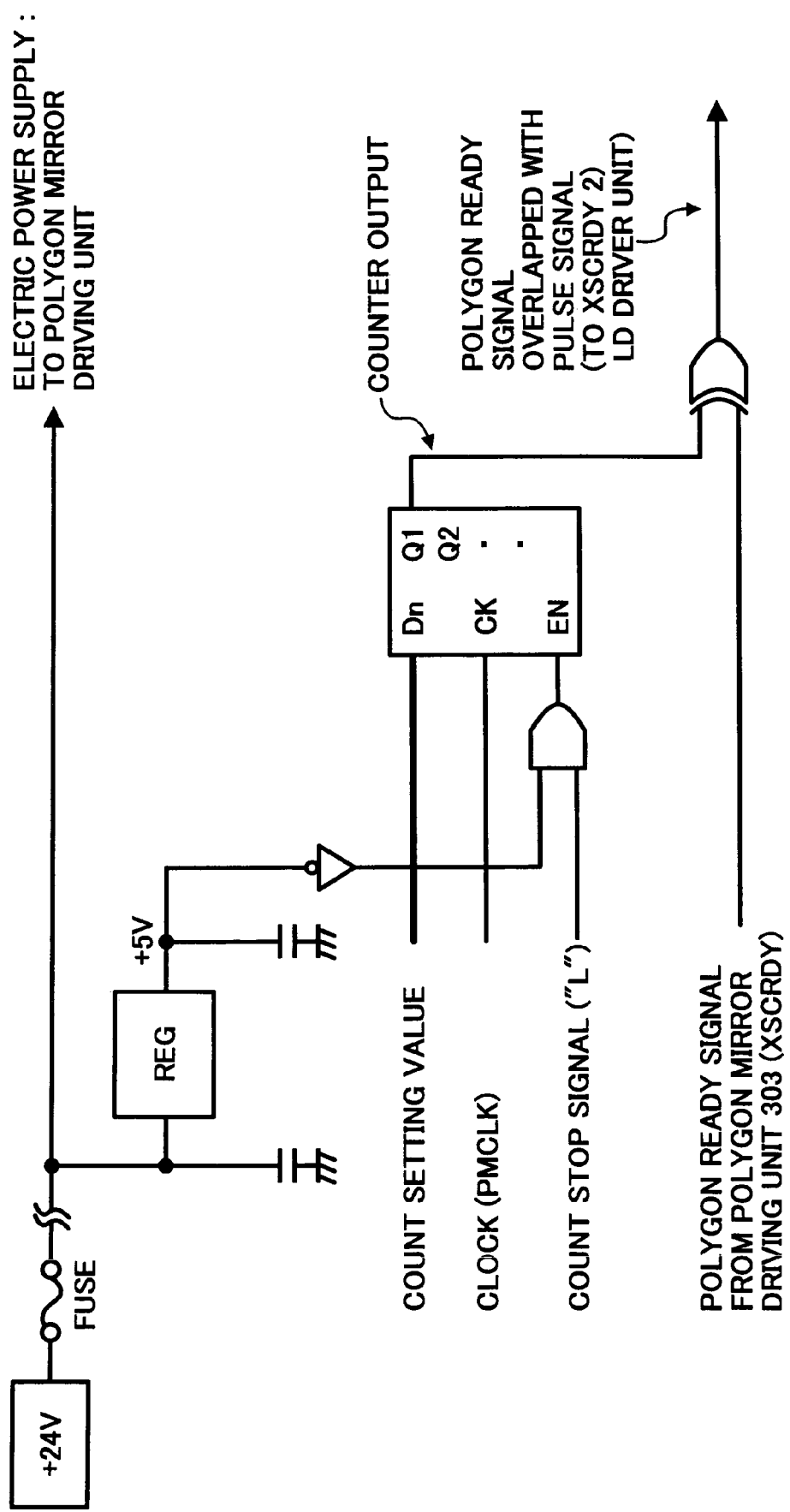
FIG. 4 is a figure depicting an embodiment of a power supply level detecting unit of the present invention.

The details of the internal circuitry of power supply level detection unit 304 are depicted in FIG. 4. In the example, 5V is drawn from +24V output with a three terminal regulator offered commercially. In addition, +5V is a value corresponding to the operating voltage of a general-purpose TTL IC and it is connected to an enable terminal of a binary counter with enable terminal. Input data Dn is further input at any setting value.

Figure 5:
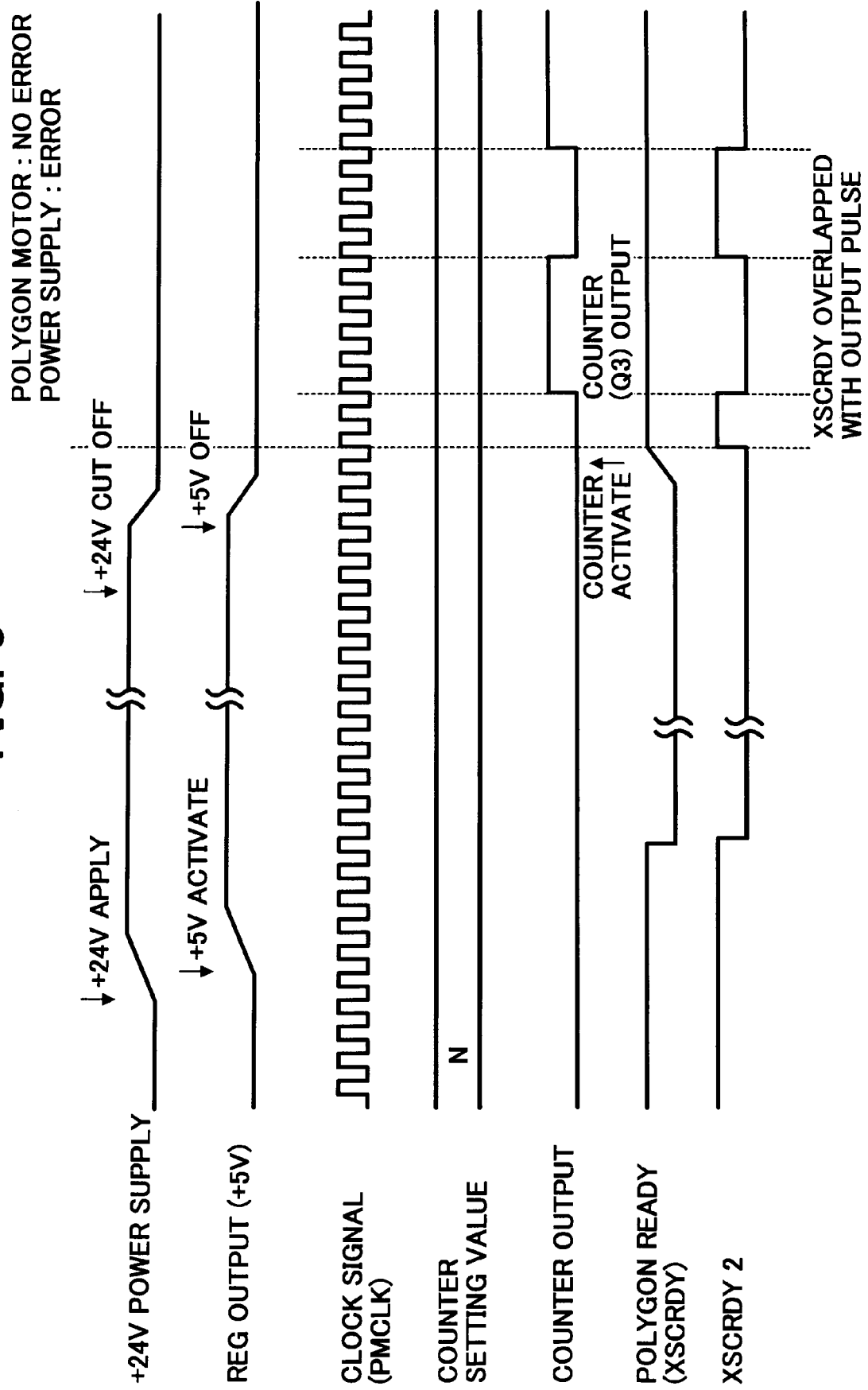
FIG. 5 is a timing chart showing an impressed current of each circuit in an embodiment of the present invention where the motor is working, an XSCRDY signal is active, and the +24 V voltage is cutoff.

As FIG. 5 shows, when +24V from electric power supply unit 301 to the image forming apparatus is cut by a fuse (+24V is cut off) for any reason when the motor is operating and when XSCRDY signal is in active state, a binary counter can be operated with a circuit such that the three terminal regulator output seems to become 0V when an enable terminal turns to the "H" level. In other words, when the motor is active, the XSCRDY signal that is a polygon ready signal changes to the "H" level, which shows that the motor is active. However, when the motor is shut down for any reason, the XSCRDY signal that is a polygon ready signal keeps the "L" level, which shows that the motor is down. In the right side of FIG. 5, when +24 V power supply and Reg. output (+5V) turn off, the polygon ready signal (XSCRDY) becomes "H" level after a delay, thereby showing that the motor is active.

Figure 3:
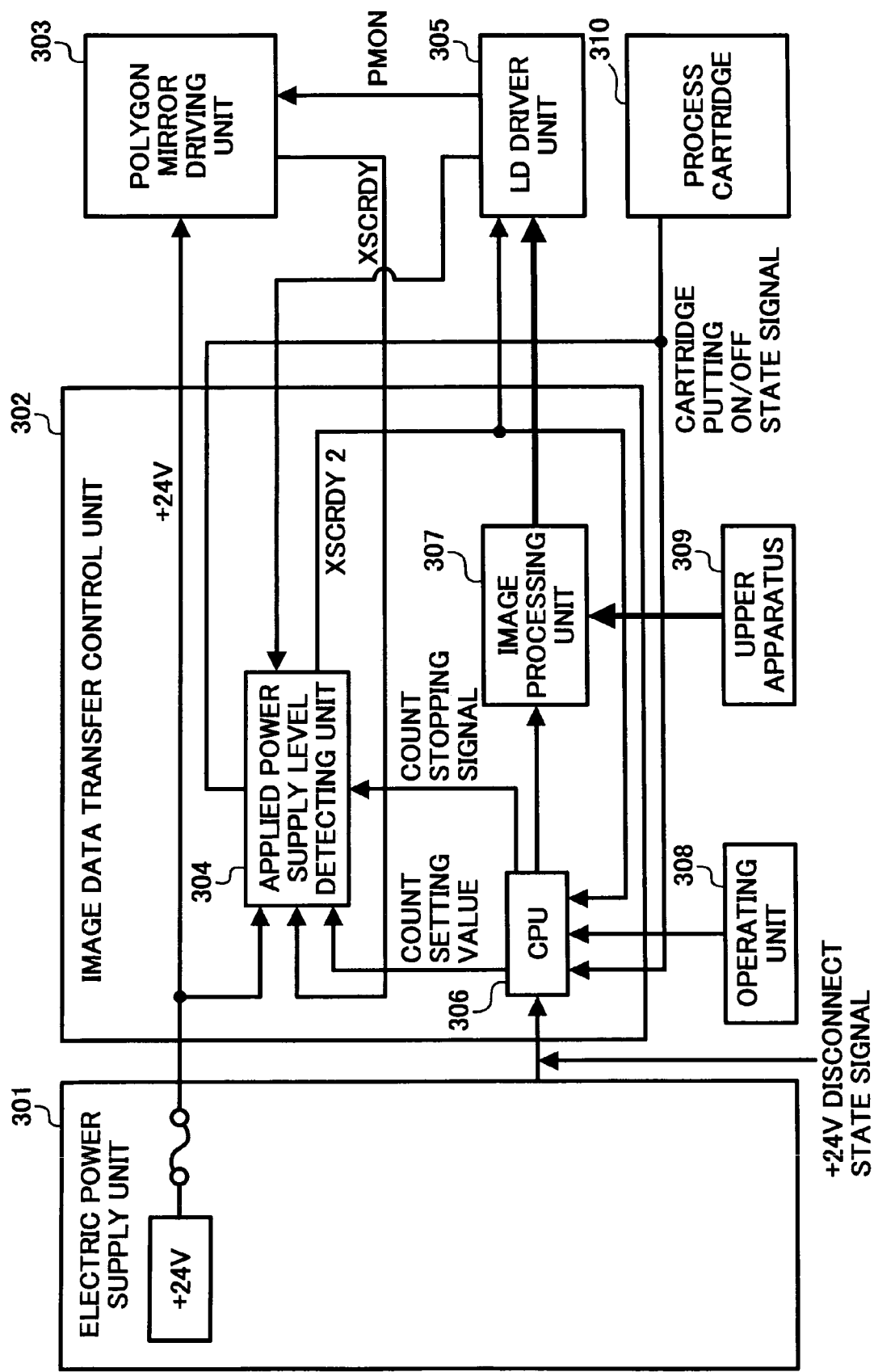
FIG. 3 is a block diagram illustrating an embodiment of a circuit of the image forming apparatus of the present invention.

On the other hand, in FIG. 3, when the +24V from electric power supply unit 301 to the image forming apparatus is cut by the fuse (+24 V is cut off) for any reason, an output of the three terminal regulator changes from +5V to 0V, and the output of the next inverter becomes "H" (+5V). And in the next OR logic gate, one of the inputs connects to a count stop signal that is "L" level and another input connects to the output of the inverter, and the output of the OR logic gate connects to the EN (enable input of the counter). When the fuse is cut off for any reason, the counter starts to count and outputs a pulse signal to the next exclusive OR logic gate, and the output of the exclusive OR logic gate that is XSCRDY2 signal, becomes a pulse signal like the XSCRDY2 signal shown in FIG. 5. The results shown in FIG. 5 are summarized as follows: XSCRDY becomes "H" level, which means the motor is active; and XSCRDY2 becomes a pulse signal, which means +24 V from electric supply unit 301 to the image forming apparatus is cut by the fuse (+24 V is cut off).

As each counter outputs (Q1, Q2, etc.) are output according to a value of a pre-set load data, it is made a logical operation (in the case exclusive or: EXOR) with any output signals and original XSCRDY signal. As thus described, a counter output with any width shown in FIG. 5 is provided by deciding any counter output bit (hereby Q3 output is connected).

On the other hand, concerning a number of counter output pulses, it is possible to control an output pulse number an operation of counter is stopped by detecting +24 V cut state inside the power supply unit 301 and providing a count stop signal (which, in this embodiment is an "L" level signal) at any time from CPU 306. By this, it is possible to generate any width and any number of pulse signal(s). The pulse signal is synchronized with a clock signal (PMCLK) supplied by the polygon mirror driving unit. The polygon clock signal (PMCLK) is input through polygon mirror drive unit 303 shown in FIG. 3 to a clock input (CK) of the binary counter shown in FIG. 4.

In the above construction, the relationship among width, number of pulse signal(s), and number of polygon face(s) in an error state is shown by, for example, as polygon frequency, f, becomes f=M/10 (M: rotation number per minutes), a generated pulse width also becomes a number in proportion to the number of polygon faces. As a result, it becomes easy to control an error state of the motor especially. The apparatus is composed to set any value from CPU 306 against a counter setting value shown in FIG. 4. It is possible to set any setting number with a high flexibility.

Further, the pulse width and number are provided by the setting input from an external input unit provided in the image forming apparatus. These values are set against CPU 306 from operation unit 308. Operation unit 308 is equivalent to operation unit 107 shown in FIG. 1. It is possible for a user or a service technician to change the setting value even after the image forming apparatus is shipped to the purchaser. On the other hand, it is preferable that the setting of the service program is not opened up by a general user (SP mode). How to enter an SP mode is typically executed by inputting a set key into each machine using operation unit 107 shown in FIG. 1.

Furthermore, as a pulse signal that is output to the laser drive unit 305 is overlapped with a state signal output from the polygon mirror drive unit, the counter output Qn shown in FIG. 4 and XSCRDY2, which is EXOR output of XSCRDY from the polygon mirror drive unit 303, are output to the LD drive unit 305. This will provide a mechanism which detects an error state of the power supply unit 301, the polygon mirror drive unit 303, or both with a simple mechanism. In other words, an overlapped signal XSCRDY 2 can show two error states in the +24 V supply and the motor according to the level or phase of a pulse of the signal.

In the case of FIG. 5, XSCRDY 2 generates a pulse signal that starts at a high level. This XSCRDY 2 signal shows that the motor is active and the +24 V power supply is cut off by a fuse.

Figure 10:
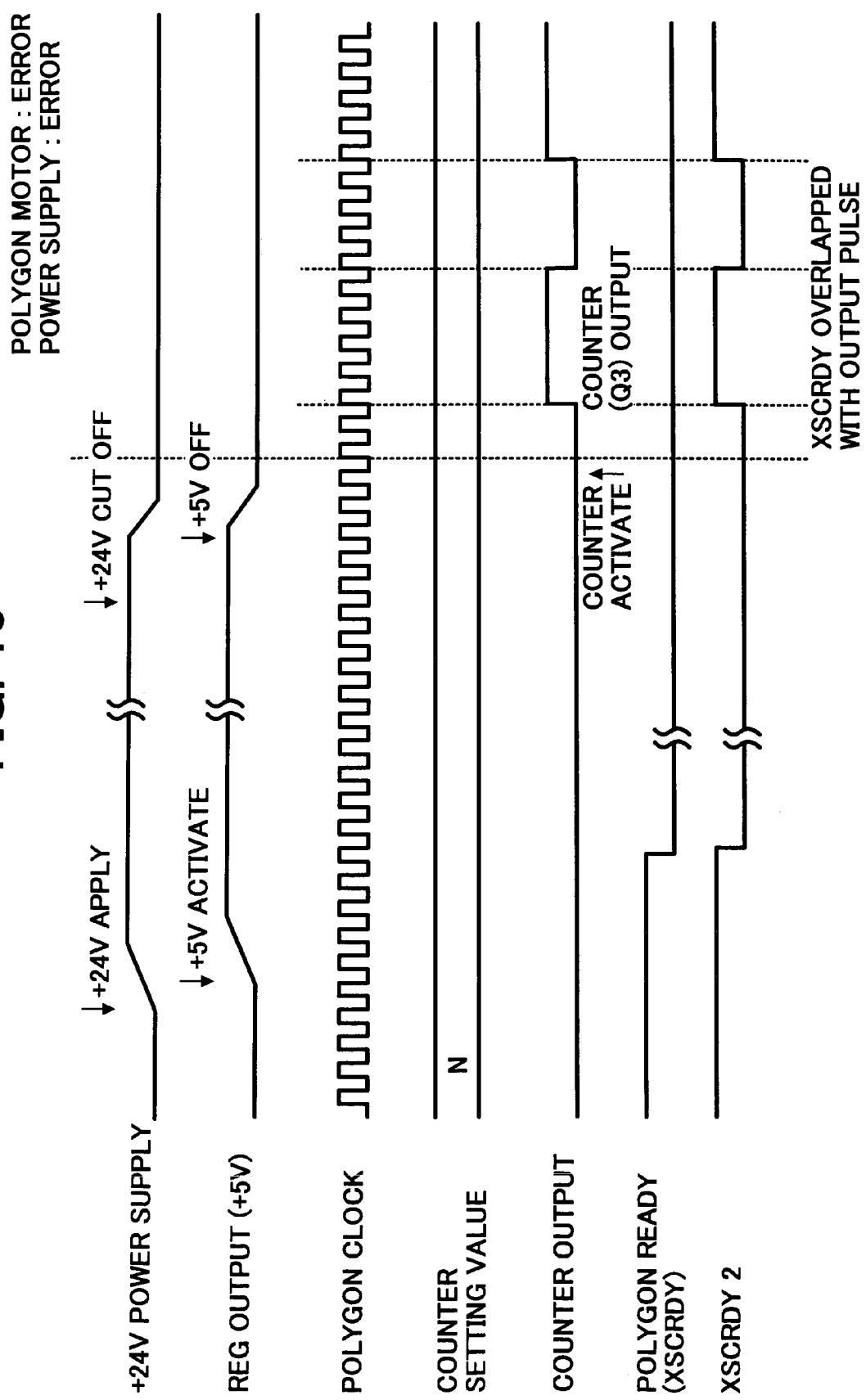
FIG. 10 is a timing chart showing an impressed current of each circuit in an embodiment of the present invention where a polygon motor, an XSCRDY signal, and +24 V voltage are down.

As FIG. 10 shows, when the +24V from the electric power supply unit 301 is cut by a fuse (+24V is cut off) for any reason in a case where the motor is down and the XSCRDY signal is also down for any reason, a binary counter can operate with a circuit constitution such that the three terminal regulator output seems to become 0V when an enabled terminal changes to an "H" level. In other words, when the motor is down, the XSCRDY signal, which is a polygon ready signal changes to an "H" level, which indicates that the motor is active (as in FIG. 5). However, when the motor is down for any reason, the XSCRDY signal that is a polygon ready signal remains at an "L" level, which indicates that the motor is down (as in FIG. 10). In the right side of FIG. 10, when the +24 V power supply and Reg. output (+5V) turn off, then the polygon ready signal (XSCRDY) stays at the "L" level, which indicates that the motor is down or non-operation (i.e. that there is an error in the operation of the motor.)

On the other hand, in FIG. 3, when the +24V from electric power supply unit 301 is cut by the fuse (+24 V is cut off) for any reason, an output of the three terminal regulator changes from +5V to 0V, and the output of the next inverter changes to the "H" level (+5V). In the next OR logic gate, one of the input connects to a count stop signal that is at an "L" level, the other input connects to the output of the inverter, and the output of the OR logic gate connects to the EN (enable input of the counter). When the fuse is cut off for any reason, the counter starts to count and outputs a pulse signal to the next exclusive OR logic gate, and the output of the exclusive OR logic gate that is XSCRDY2 signal becomes a pulse signal like the XSCRDY2 signal shown in FIG. 10. The results shown in FIG. 10 are summarized as follows: XSCRDY stays at the "L" level, which means the motor is down for any reason; and the XSCRDY2 signal becomes a pulse signal, which means that the +24 V from the electric supply unit 301 is cut by a fuse (+24 V is cut off).

In the case of FIG. 10, XSCRDY 2 generates a pulse signal that starts at a low level. This XSCRDY 2 signal shows that the motor is down and the +24 V power supply is cut off by a fuse.

Figure 11:
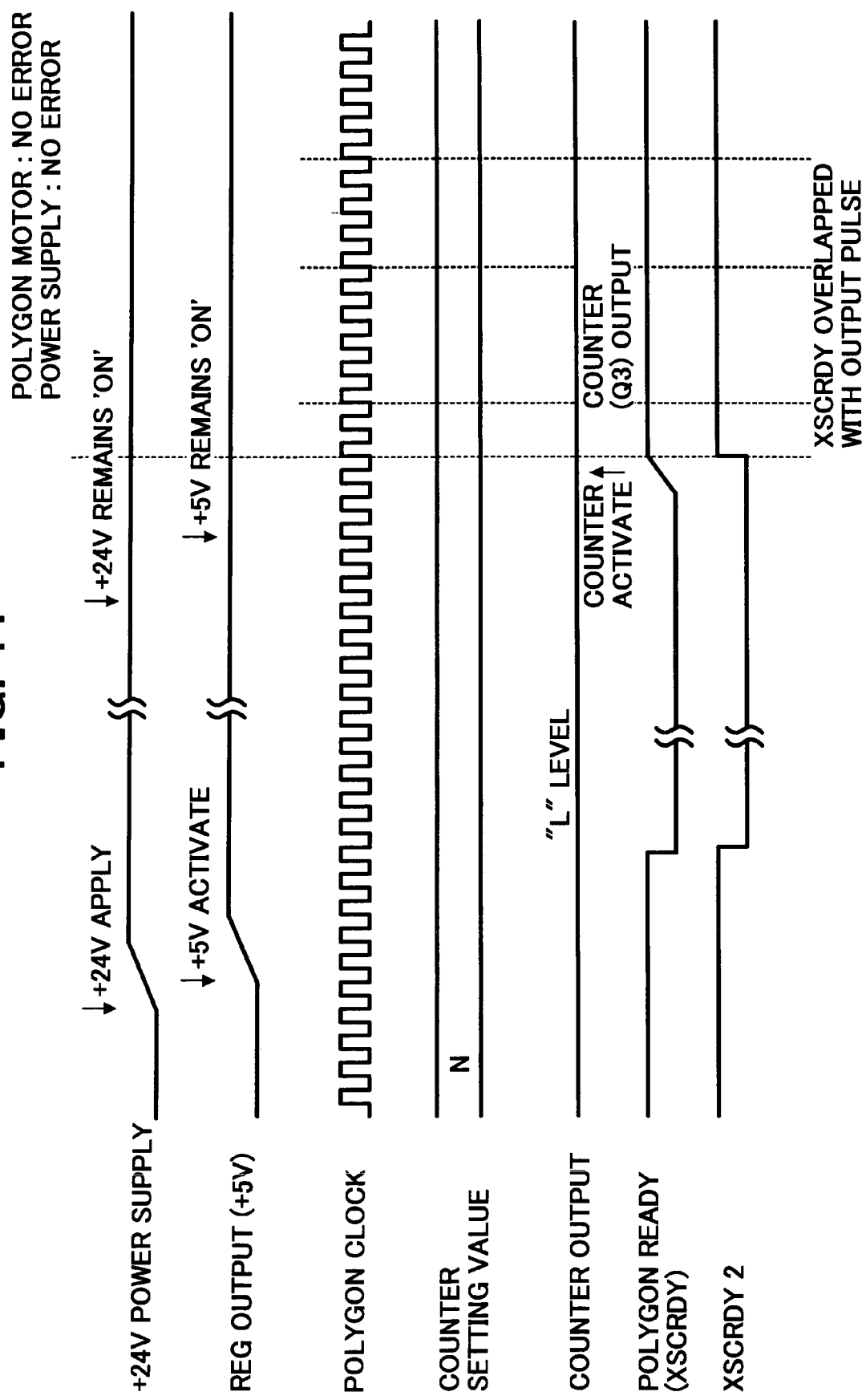
FIG. 11 is a timing chart showing an impressed current of each circuit in an embodiment of the present invention where a polygon motor, an XSCRDY signal, and +24 V voltage are active.

As FIG. 11 shows, when the +24V from the electric power supply unit 301 is connected by a fuse (+24V is connected) when the motor is operating and the XSCRDY signal is in an active state, a binary counter is disabled from operating by a circuit constitution such that the three terminal regulator output seems to maintain +5V when an enabled terminal maintains an "L" level. In other words, when the motor is active, the polygon ready signal XSCRDY changes to an "H" level, which indicates that motor is active. However, when the motor is down for any reason, the polygon ready signal XSCRDY maintains an "L" level, which indicates that the motor is down. In the right side of FIG. 11, as the +24 V power supply and Reg. output (+5 V) remain turned on; the polygon ready signal XSCRDY maintains the "L" level. The signal shows that the motor is down for any reason.

On the other hand, in FIG. 3, when the +24 V from the electric power supply unit 301 is connected by the fuse (+24 V is connected), an output of the three terminal regulator maintains +5 V, and the output of the next inverter maintains the "L" level (0 V). In the next OR logic gate, one of the inputs connects to a count stop signal that is at an "L" level, the other input connects to the output of the inverter, and the output of the OR logic gate connects to the EN (enable input of the counter). When the fuse is connected to +24 V, the counter does not start to count and outputs at an "H" level to the next exclusive OR logic gate, and the output of the exclusive OR logic gate that is the XSCRDY2 signal changes to the "H" level like the XSCRDY2 signal shown in FIG. 11. The results shown in FIG. 11 are summarized as follows: XSCRDY changes to the "H" level, which indicates that the motor is active; and XSCRDY2 changes to and maintains the "H" level, which indicates that the +24 V from electric supply unit 301 is connected by the fuse (+24 V is connected).

In the case of FIG. 11, XSCRDY 2 changes to a "H" level as the power supply remains on. This XSCRDY 2 signal shows that the motor is active and the +24 V power supply is connected by the fuse.

Figure 12:
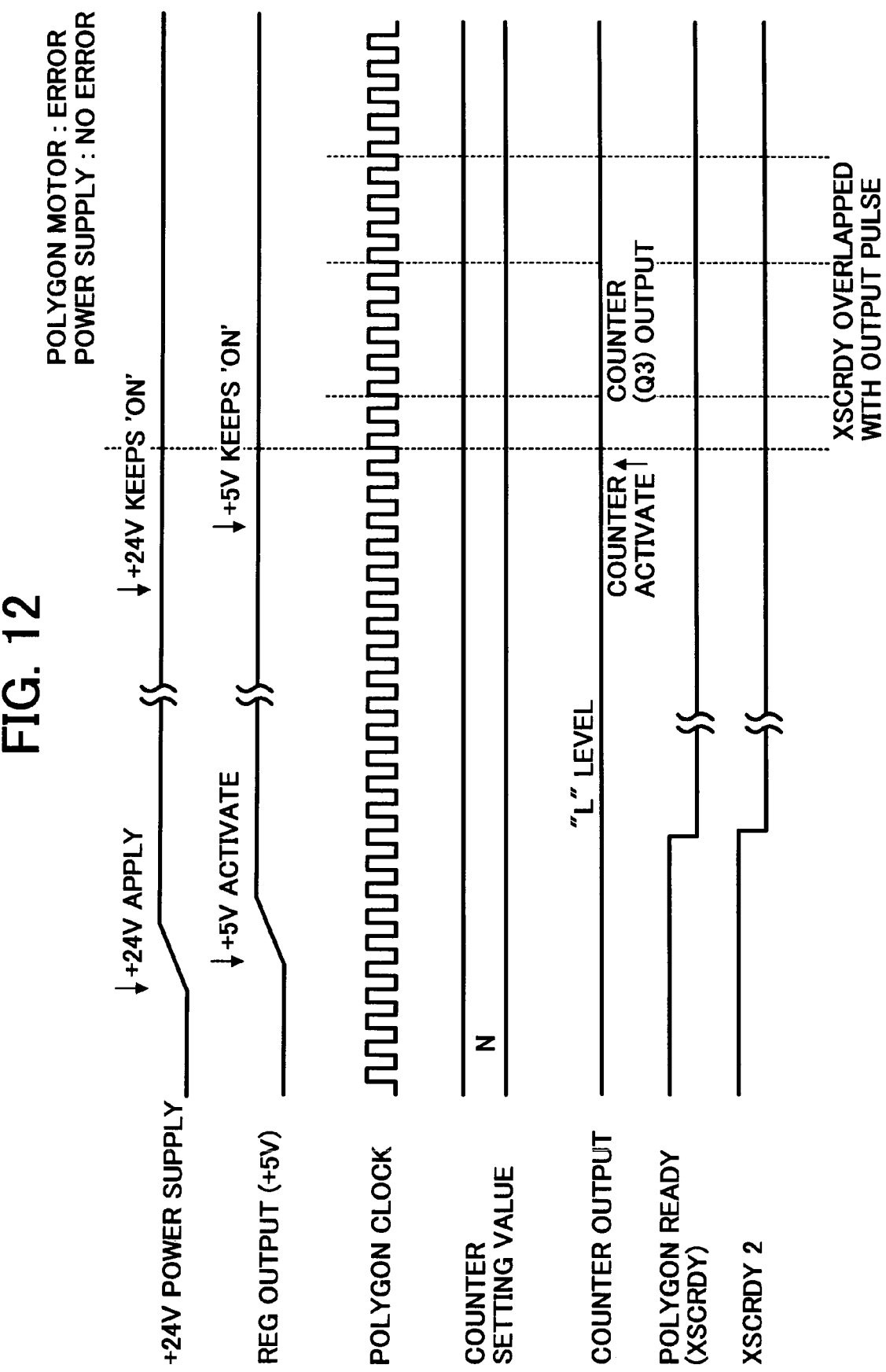
FIG. 12 is a timing chart showing an impressed current of each circuit in an embodiment of the present invention where a polygon motor is down, an XSCRDY signal is also down, and +24 V voltage is active.

As FIG. 12 shows, when the +24V from electric power supply unit 301 is connected by a fuse (+24V is connected) when the motor is down and the XSCRDY signal is also down, a binary counter is disabled from operating by a circuit constitution such that the three terminal regulator output seems to maintain +5V when an enabled terminal maintains an "L" level. In other words, when the motor is active, the polygon ready signal XSCRDY changes to an "H" level, which indicates that the motor is active. However, when the motor is down for any reason, the polygon ready signal XSCRDY maintains an "L" level, which indicates that the motor is down. In the right side of FIG. 12, as the +24 V power supply and Reg. output (+5 V) remains turned on, the polygon ready signal XSCRDY maintains the "L" level. The signal shows that the motor is down for any reason.

On the other hand, in FIG. 3, when the +24 V from the electric power supply unit 301 is connected by the fuse (+24 V is connected), an output of the three terminal regulator maintains +5 V, and the output of the next inverter maintains the "L" level (0 V). In the next OR logic gate, one of the inputs connects to a count stop signal that is at the "L" level, the other input connects to the output of the inverter, and the output of the OR logic gate connects to the EN (enable input of the counter). When the fuse is connected to +24 V, the counter does not start to count and outputs the "H" level to the next exclusive OR logic gate, and the output of the exclusive OR logic gate that is the XSCRDY2 signal changes to the "H" level like the XSCRDY2 signal shown in FIG. 12. The results shown in FIG. 12 are summarized as follows: XSCRDY maintains the "L" level, which indicates that the motor is down for any reason; and XSCRDY2 maintains the "L" level, which indicates that the +24 V from electric supply unit 301 is connected by the fuse (+24 V is connected).

In the case of FIG. 12, XSCRDY 2 maintains the "L" level as power supply remains turned on. This XSCRDY 2 signal shows that the motor is down and the +24 V power supply is connected by the fuse.

A mechanism is now explained that does not judge an error of the polygon mirror drive unit when a particular pulse signal that is overlapped with a state signal output from polygon mirror drive unit is detected with a unique sampling frequency. FIG. 6, shows how many times within a specified time the overlapped signal (XSCRDY2) detects any levels (non-active state: "H" level) measured with a unique frequency of the CPU 306. In general, regarding the behavior of a XSCRDY signal in the polygon mirror drive unit 303, typically a service call of the system (SC) is registered when the error state reaches a certain number of motor errors (SCXXX) etc.

In FIG. 6, it is decided not to judge a polygon mirror drive unit 303 error when the "H" level of XSCRDY2 is detected, for example, three times inside CPU 306 at any unique frequency (unique period is also possible). In other words, it is decided to transmit to non-active state of polygon motor ready (XSCRDY) by cut off +24 V as a matter of power supply unit which is other input system. This will enable to judge easily error state of image forming apparatus cut off the power to polygon mirror drive unit by any reasons and error state of polygon motor itself (SCXXX).

A digital full color copier having 1 drum is shown in the embodiment disclosed herein; however Tandem type machine that has four drums can be applied for machinery of a mono color without distinction of the kind.

Figure 7A:
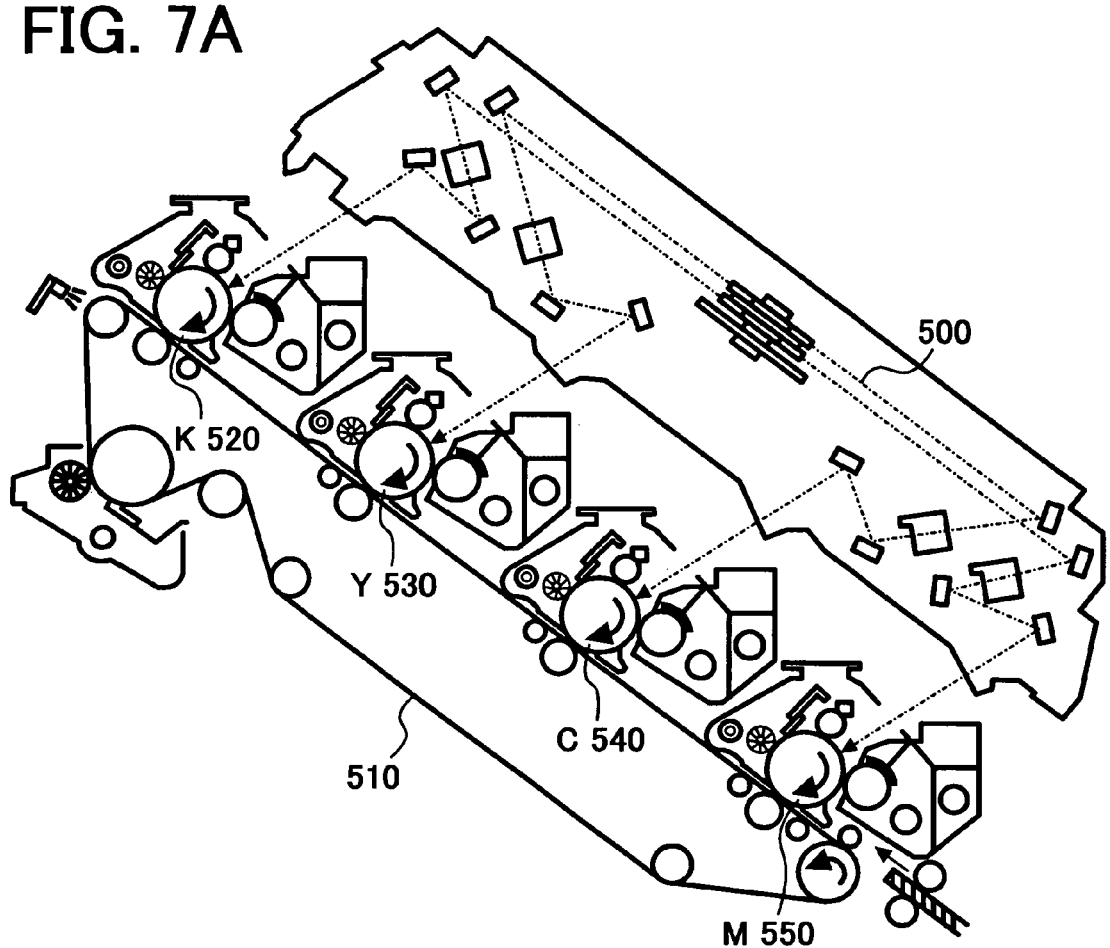
FIG. 7A is a schematic diagram of an embodiment of an image forming apparatus including process cartridges of the present invention.
Figure 7B:
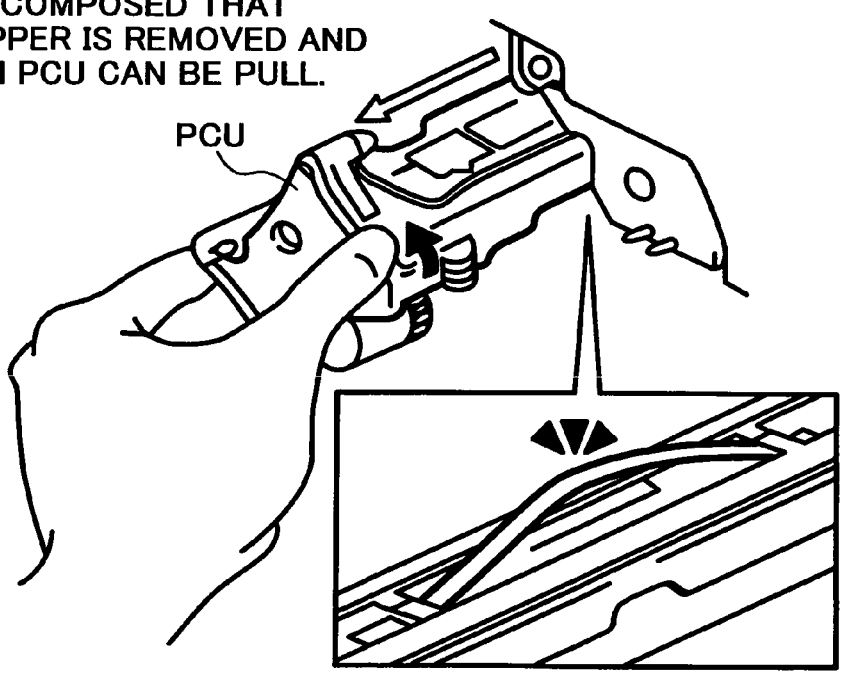
FIG. 7B is a perspective view of a process cartridge being removed from an image forming apparatus by an operator.

An example of a photoconductor unit (process cartridge) is depicted in FIG. 7A and include a photoconductor, an electric charge unit, a development unit, and a cleaning unit provided all in one. Each photoconductor unit (PCU) (black photoconductor unit K 520, yellow photoconductor unit Y 530, cyan photoconductor unit C 540, magenta photoconductor unit M 550) are constructed so that they can be changed by removing each stopper, as shown in FIG. 7B. The paper conveyance path is arranged in order of the unit M 550, the unit C540, the unit Y 530, and the unit K 520 sequentially from the lower right part shown in FIG. 7A. Each photoconductor unit is configured to be incompatible with the other color units, such that it is not possible to incorrectly install a process cartridge of a particular color in the wrong color unit.

Transfer unit 510 is provided in a diagonal course and is configured to convey paper from the right lower part as shown in FIG. 7A. An image on each photosensitive drum of the photoconductor is copied onto the sheet. Furthermore, a transfer unit is pulled by knocking down a cancellation lever. Transfer unit 510 can put on and off in transfer unit exchange time.

Figure 8:
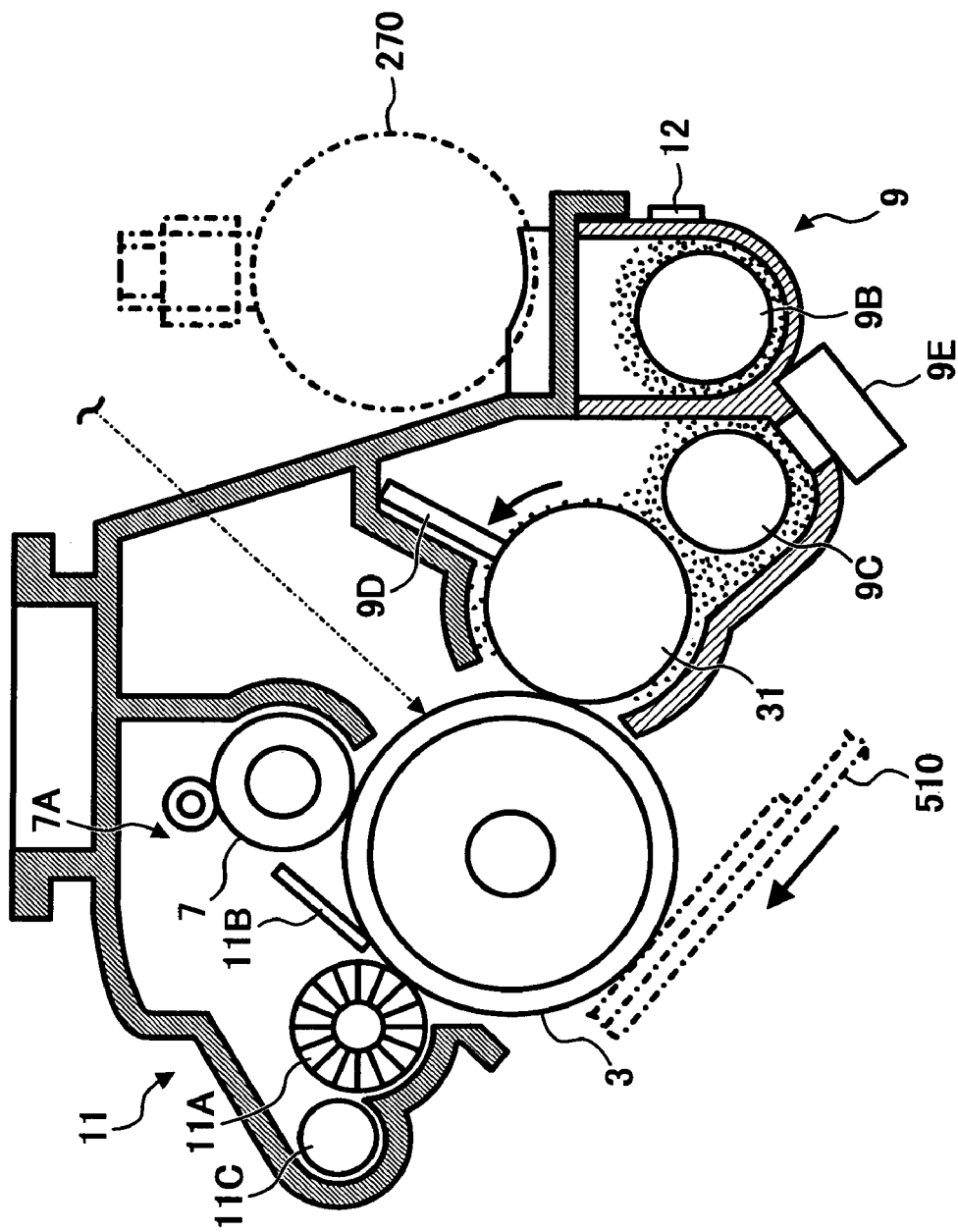
FIG. 8 is a cross-sectional view of an embodiment of a process cartridge of the present invention.

The main body of the photoconductor unit will now be explained with reference to FIG. 8. Toner conveyance from toner cartridge 270 to developing unit 9 is done with an air pump (not shown). In addition, the toner cartridge 270 can detect when the toner level is low with a built in optical sensor (not shown) in a nozzle (not shown) for conveyance. Toner conveyed from the toner cartridge 270 to the development unit 9 is agitated with the developer by two screws (conveyance screws 9B, 9C) and conveyed to developing roller (or developer carrier) 31. The amount developer and toner adhering to the developing roller is regulated by a doctor blade 9D.

The developing unit 9 includes a toner density sensor 9E, which detects the toner density and controls toner density. The charging of photosensitive drum (or image carrier) 3 is performed by charging roller 7. Charging roller 7 rotates in a reverse direction to a drum. The charging roller 7 provides a uniform electric charge on the drum 3. In the upper part of the charging roller 7, a charge cleaning roller 7A is installed permanently with charging roller 7. The charge cleaning roller 7A cleans the charging roller 7.

Unused toner on the photosensitive drum 3 is collected using a cleaning blade 11B and a cleaning brush 11A in cleaning unit 11. Cleaning blade 11B is installed in an inclined manner in a counter direction against a drum rotation and is established permanently with a drum. Cleaning brush 11A is rotated in a direction opposite to the rotation of the drum 3. It is mixed with a blade and unused toner is collected. The unused toner is sent to a toner conveyance screw 11C. The unused toner is conveyed by the toner conveyance screw 11C to an unused toner vent and collected by an unused toner bottle (not shown).

Nonvolatile memory is provided in memory tag 12, which stores that information necessary for control of each photosensitive drum unit (a process cartridge unit), cartridge identification (ID), the production date, age or date of first use, recycling frequency, the date as of the copy number of sheets, etc. In addition, a tag of the contact type that carries an integrated circuit (IC) chip, a tag which carries a non-contact type IC chip or a non-contact type chip card may be carried instead of the nonvolatile memory (NVRAM) tag 12.

Next the image formation process is explained. The photosensitive drum 3 is driven to rotate at a predetermined speed. While the photosensitive drum 3 rotates, it receives a uniform charge of electricity of an original or negative predetermined electrical current potential from the charging unit 7. Image exposure light is received from an image exposure unit, such as writing system 500 (FIG. 7A), via slit exposure or laser beam scanning exposure. An electrostatic latent image is formed in turn on a side of the photosensitive drum 3. The electrostatic latent image that is formed is developed using toner by a developing unit 9. The developed toner image is copied to the transcription materials by synchronizing a turn of photosensitive drum 3 with the movement of the transfer unit 510 (FIG. 7A), which feeds paper from a paper feed part.

The transfer materials that received transcription are separated from the surface of the photosensitive drum 3, and introduced into an image fixing unit in order to fix the image thereto. The surface of the photosensitive drum 3 after image transcription is cleaned of any remaining toner by cleaning unit 1. Further, the photosensitive drum 3 can be used repeatedly in this manner for image formation after the electricity is removed.

In the above configuration, the image formation unit of the present embodiment includes a mecha switch (a mechanical switch) as a unit attachment detect unit that detects whether a process cartridge is attached. When a process cartridge is loaded in the image forming unit using a mounting means, the mechanical switch turns ON by fitting in a reentrant of the image formation unit and the attachment of the process cartridge is detected through the installation of an operation piece from a toner bottle.

A procedure for detecting a cartridge presence and for detecting a strange medium error when a process cartridge is mounted to the image formation unit in now explained. In order perform an image formation in the image formation unit of the present embodiment, an opening and shutting cover of the image formation unit is first opened, and then a process cartridge is loaded at a prescribed position. At this time, the connectors that are connected to the memory tag 12 of the process cartridge are connected to the image formation unit.

When the connectors of the memory tag 12 are connected, a mechanical switch detects the presence of the process cartridge when the switch is actuated. When the mechanical switch is not actuated, then it is judged that a process cartridge is not present. When the mechanical switch is actuated, thereby detecting the presence of a process cartridge, then a cartridge attachment and detachment state signal is transmitted to the CPU 306 in the image formation unit (FIG. 3). At this time, a signal is transmitted to the supply power level detect unit 304 and it is connected with the pulse generation circuit.

Further, regarding the closing of an opening and shutting cover for the image formation unit, if loading of a process cartridge is detected by the mechanical switch, a portion of the process cartridge is approached by connectors of the image formation unit connected to an NV-RAM by turning of a gear driving an image body to the drive unit and photosensitive drum to the image formation unit.

In this way a process cartridge and state of attachment with the image formation device unit are detected during attachment and detachment, and it can be detected if a process cartridge unexpected falls off or becomes loose/disconnected during a printing operation and controls a unit interlocked thereto (e.g., polygon mirror drive unit) in such a situation.

Figure 9:
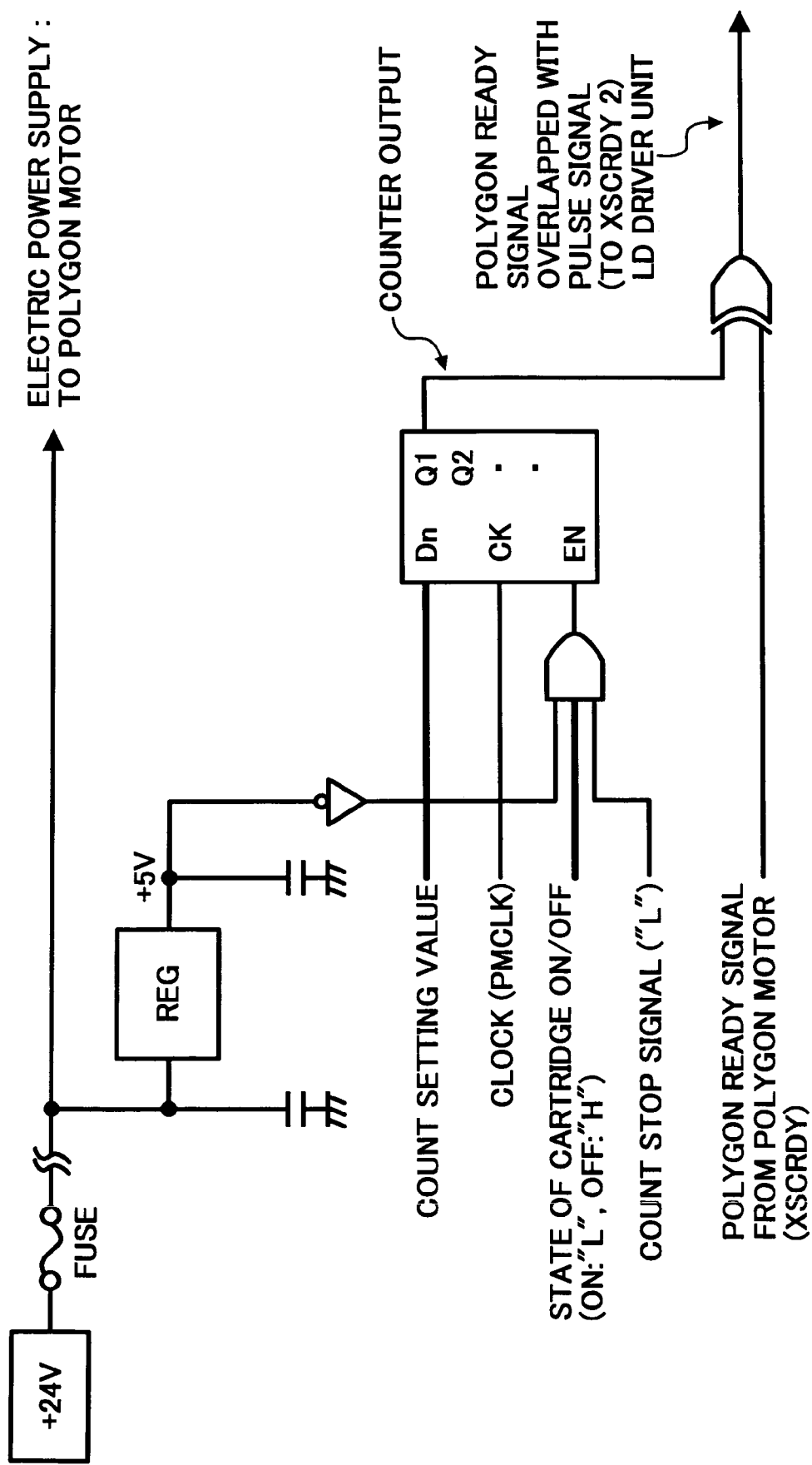
FIG. 9 is a figure depicting an embodiment of a power supply level detecting unit of the present invention.

In FIG. 9, if a level of attaching is "L" and a level of detaching is "H" in a process cartridge attachment and detachment signal, a binary counter is enabled when a process cartridge is present and the counter counts for preset count setting value. Accordingly, a pulsed signal or an overlapped polygon ready signal is output to LD drive unit 305 and CPU 306. Thus, it is possible to detect, using polygon ready signal (XSCRDY2), a state in which a process cartridge is off or it is not loaded normally. As this detection operates to directly detect attachment/detachment of a process cartridge and polygon mirror drive unit 303 and has a function of stopping a polygon motor drive, it is possible to prevent an error in image generation and reduce unnecessary image generation. Furthermore, the present invention reduces unnecessary usage and load on all of the components of the image formation unit.

The above embodiments utilize a polygon mirror drive unit, an LD drive unit, and other image formation unit printing of an electrophotographic system. However, it is possible to apply the above invention to other types of image forming apparatuses.

The invention claimed is:

1. An image forming apparatus for forming images with an electrophotographic system, said image forming apparatus comprising:
    a laser drive unit configured to control a laser light;
    a polygon mirror configured to reflect the laser light;
    a polygon mirror drive unit including a polygon motor and configured to rotate said polygon mirror;
    an electric power supply unit configured to supply electric power to the polygon mirror drive unit;
    a polygon motor operation condition signal generating device configured to generate an operation condition signal in accordance with an operation condition of the polygon motor;
    a first pulse signal generating device configured to generate a first pulse signal having a prescribed level and frequency when the electric power supply unit stops supplying power;
    a second pulse signal generating device configured to generate a second pulse signal based on the polygon motor operation condition signal and the first pulse signal; and
    an error occurrence determining device configured to determine which one of the polygon mirror drive unit and the electric power supply unit is in an abnormal condition based on the second pulse signal.

2. The image forming apparatus according to claim 1, wherein the first pulse signal generating device is configured to generate the first pulse signal synchronized with a clock signal supplied to said polygon mirror drive unit and output to the laser drive unit of the electrophotographic system.

3. The image forming apparatus according to claim 1, wherein the first pulse signal includes a predetermined pulse width.

4. The image forming apparatus according to claim 1, further comprising an external input unit and the first pulse signal generating device is configured to generate the first pulse signal to include a pulse width set by the external input unit.

5. The image forming apparatus according to claim 1, wherein, when the second pulse signal starts as a pulse signal at an H level synchronized with a clock signal, then the polygon mirror drive unit is active and the electric power supply unit has an error.

6. The image forming apparatus according to claim 1, wherein, when the second pulse signal starts as a pulse signal at an L level synchronized with a clock signal, then the polygon mirror drive unit has an error and the electric power supply unit has an error.

7. The image forming apparatus according to claim 1, wherein, when the second pulse signal is detected at and maintains an H level synchronized with a clock signal, then the polygon mirror drive unit is active and the electric power supply unit is active.

8. The image forming apparatus according to claim 1, wherein, when the second pulse signal is detected at and maintains an L level synchronized a clock signal, then the polygon mirror drive unit has an error and the electric power supply unit is active.

9. The image forming apparatus according to claim 1, further comprising:
    a developer cartridge configured to accommodate a developer;
    an image carrier configured to receive a latent image; and
    a developer carrier configured to supply developer to the image carrier,
    wherein a removable unit including the developer carrier and the developer cartridge is removable from the image forming apparatus,
    wherein a detecting unit is configured to detect a presence of the removable unit when the removable unit is attached to the image forming apparatus, and
    wherein the detecting unit is configured to produce a signal indicating the presence of the removable unit, the signal being supplied to the error determining device.

* * * * *